United States Patent
Won et al.

(10) Patent No.: US 9,099,724 B2
(45) Date of Patent: Aug. 4, 2015

(54) BATTERY CELL ASSEMBLY, METHOD OF MANUFACTURING THE SAME USING A JIG ASSEMBLY

(71) Applicant: Samsung SDI Co., Ltd., Yongin-si, Gyeonggi-do (KR)

(72) Inventors: Hee-Youn Won, Yongin-si (KR); Dae-Yon Moon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 161 days.

(21) Appl. No.: 13/691,424

(22) Filed: Nov. 30, 2012

(65) Prior Publication Data

US 2014/0072853 A1 Mar. 13, 2014

(30) Foreign Application Priority Data

Sep. 13, 2012 (KR) .................. 10-2012-0101808

(51) Int. Cl.
*H01M 2/02* (2006.01)
*H01M 2/06* (2006.01)
*H01M 10/06* (2006.01)
*H01M 16/00* (2006.01)
(Continued)

(52) U.S. Cl.
CPC .............. *H01M 2/204* (2013.01); *B23K 11/002* (2013.01); *H01M 2/1061* (2013.01); *H01M 10/0436* (2013.01); *H01M 2/06* (2013.01); *H01M 10/052* (2013.01); *H01M 16/00* (2013.01); *H01M 2220/30* (2013.01); *Y10T 29/53135* (2015.01)

(58) Field of Classification Search
CPC ....... H01M 2/20; H01M 10/04; H01M 2/204; H01M 2/1061; H01M 2/06; H01M 16/00; H01M 10/0436; H01M 10/052; H01M 2220/30

USPC ......... 429/7, 160, 163, 66, 99, 158; 29/623.1, 29/730
See application file for complete search history.

(56) References Cited

U.S. PATENT DOCUMENTS 7,968,227 B2 6/2011 Cho
2007/0254211 A1* 11/2007 Kambe et al. ................. 429/160
(Continued)

FOREIGN PATENT DOCUMENTS

EP 2 284 927 2/2011
JP 2002-184371 A 6/2002
(Continued)

OTHER PUBLICATIONS

Extended European Search Report dated Jul. 29, 2013 for corresponding EP Application No. 13157888.2-1360.
(Continued)

*Primary Examiner* — Kenneth Douyette
(74) *Attorney, Agent, or Firm* — Knobbe Martens Olson & Bear LLP

(57) ABSTRACT

A battery cell assembly and a method of manufacturing the same. The battery cell assembly includes a plurality of battery cells including anode terminals and cathode terminals, a plurality of lead tabs disposed on at least one of the anode terminal and the cathode terminal of each battery cell, wherein a groove is formed in each lead tab, and a lead plate disposed on top portions of the plurality of lead tabs, the lead plate including a connector contacting the plurality of lead tabs and a through hole formed in a position corresponding to the groove of the lead tab.

9 Claims, 4 Drawing Sheets

(51) Int. Cl.
  H01M 2/20    (2006.01)
  H01M 10/04   (2006.01)
  B23K 11/00   (2006.01)
  H01M 2/10    (2006.01)
  *H01M 10/052*    (2010.01)

(56) References Cited

U.S. PATENT DOCUMENTS

| | | | |
|---|---|---|---|
| 2008/0118823 A1 | 5/2008 | Yang et al. | |
| 2008/0193850 A1* | 8/2008 | Ellis | 429/234 |
| 2008/0286634 A1* | 11/2008 | Naito | 429/92 |
| 2009/0087738 A1* | 4/2009 | Kim | 429/185 |
| 2009/0130550 A1* | 5/2009 | Kim | 429/163 |
| 2009/0130552 A1* | 5/2009 | Kim | 429/175 |
| 2011/0146064 A1* | 6/2011 | Feaver et al. | 29/623.2 |
| 2011/0159353 A1 | 6/2011 | Byun et al. | |
| 2012/0189900 A1 | 7/2012 | Park et al. | |

FOREIGN PATENT DOCUMENTS

| | | |
|---|---|---|
| JP | 2003-077442 A | 3/2003 |
| KR | 10-2006-0019767 A | 3/2006 |
| KR | 10-0571272 | 4/2006 |
| KR | 2008-0037441 | 4/2008 |
| KR | 2008-0100980 | 11/2008 |
| KR | 10-2011-0076738 A | 7/2011 |

OTHER PUBLICATIONS

Korean Notice of Allowance dated Apr. 28, 2014 for Korean Patent Application No. KR 10-2012-0101808 which corresponds to captioned U.S. Appl. No. 13/691,424.

* cited by examiner

BATTERY CELL ASSEMBLY, METHOD OF MANUFACTURING THE SAME USING A JIG ASSEMBLY

RELATED APPLICATIONS

This application claims the benefit of Korean Patent Application No. 10-2012-0101808, filed on Sep. 13, 2012, in the Korean Intellectual Property Office, the disclosure of which is incorporated herein in its entirety by reference.

BACKGROUND

1. Field

One or more embodiments of the present invention relate to a battery cell assembly, a battery pack, a method of manufacturing a battery cell assembly, and a jig assembly for manufacturing a battery cell assembly.

2. Description of the Related Art

Portable electronic devices, such as notebook computers, tablet computers, smart phones, etc., are widely used. A portable electronic device includes a battery pack for storing power to use the portable electronic device for a predetermined time even when the portable electronic device is disconnected from an external power source. The battery pack may include a plurality of battery cells which may be secondary cells that are rechargeable for repetitive use.

The plurality of battery cells included in the battery pack are connected in series or in parallel, and the serial or parallel connection is achieved by a lead plate which connects terminal portions of the respective battery cells.

SUMMARY

One or more embodiments of the present invention include a battery cell assembly in which an alignment of battery cells and a lead plate is accurate such that welded portions between the battery cells and the lead plate are formed at accurate positions, and a battery pack including the battery cell assembly.

One or more embodiments of the present invention also include a method of manufacturing a battery cell assembly in which welded portions between battery cells and a lead plate are formed at accurate positions.

One or more embodiments of the present invention also include a jig assembly for stably supporting battery cells and a lead plate in position during welding such that welded portions between the battery cells and the lead plate are formed at accurate positions.

Additional aspects will be set forth in part in the description which follows and, in part, will be apparent from the description, or may be learned by practice of the presented embodiments.

According to one or more embodiments of the present invention, a battery cell assembly includes a plurality of battery cells including anode terminals and cathode terminals, a plurality of lead tabs disposed on at least one of the anode terminal and the cathode terminal of each battery cell, in which a groove is formed in each lead tab, and a lead plate disposed on top portions of the plurality of lead tabs, the lead plate including a connector contacting the plurality of lead tabs and a through hole formed in a position corresponding to the groove of the lead tab.

The connector of the lead plate may include a first welded portion and a second welded portion which are spaced apart from each other with a slit therebetween.

A battery pack may include the above-described battery cell assembly.

According to one or more embodiments of the present invention, a jig assembly for welding the lead tab and the lead plate of the battery cell assembly includes a case jig receiving the battery cell assembly therein, and the case jig including an opening formed therein to expose the lead plate to the outside and a cover jig coupled to the opening of the case jig to be disposed on a top portion of the lead plate, the cover jig including an exposure opening for exposing the connector of the lead plate and a guide pin passing through the through hole of the lead plate to be inserted into the lead tab.

One of the case jig and the cover jig may include a coupling hole, and the other of the case jig and the cover jig may include a coupling protrusion that is inserted into the coupling hole when the case jig and the cover jig are coupled.

According to one or more embodiments of the present invention, a method of manufacturing a battery cell assembly includes providing a plurality of battery cells including anode terminals and cathode terminals, disposing a lead tab having a groove formed therein on at least one of the anode terminal and the cathode terminal of the battery cell, disposing a lead plate on a top portion of the lead tab, the lead plate having a through hole formed in a position corresponding to the groove of the lead tab and including a connector welded to the lead tab, disposing a cover jig on a top portion of the lead plate, the cover jig having formed therein an exposure opening for exposing the connector and including a guide pin passing through the through hole of the lead plate to be inserted into the groove of the lead tab, and electric-resistance-welding the connector of the lead plate through the exposure opening of the cover jig.

The method may further include inserting the battery cells into the case jig including an opening, through which the lead plate is exposed, in which in the disposing of the cover jig, the cover jig is coupled to the opening of the case jig.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present invention will become apparent from embodiments described below in detail with reference to the accompanying drawings. However, the present invention is not limited to the disclosed embodiments and may be implemented in different forms. The embodiments are provided to complete the disclosure of the present invention and to allow those of ordinary skill in the art to fully understand the scope of the present invention, and the present invention is defined merely by the claims. The terms used herein are for illustrative purposes of the inventive concept only and should not be construed to limit the meaning or the scope of the inventive concept. As used in this specification, a singular form may, unless definitely indicating a particular case in terms of the context, include a plural form. Also, the expressions "comprise" and/or "comprising" used in this specification neither define the mentioned components, steps, operations and/or elements, nor exclude the presence or addition of one or more other different components, steps, operations and/or elements, or addition of these. As used herein, terms such as "first," "second," etc. are used to describe various components, but components should not be defined by these terms. Terms are used only for distinguishing one component from another component.

Figure 1:
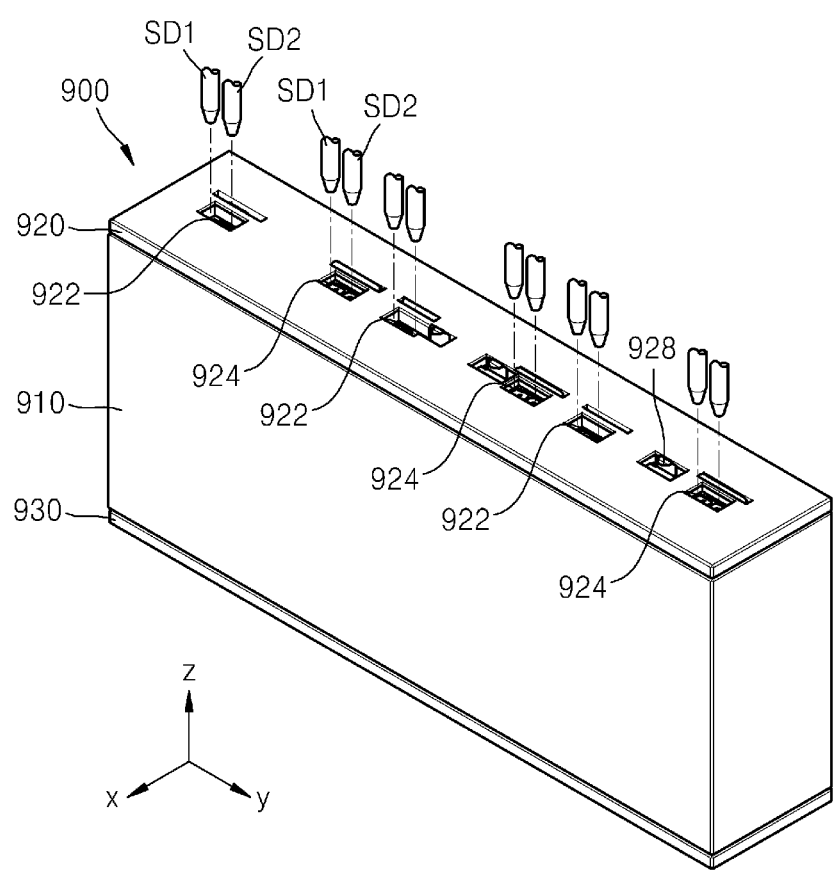
FIG. 1 is a perspective view schematically showing a battery cell assembly and a jig assembly supporting the battery cell assembly according to an embodiment of the present invention.
Figure 2:
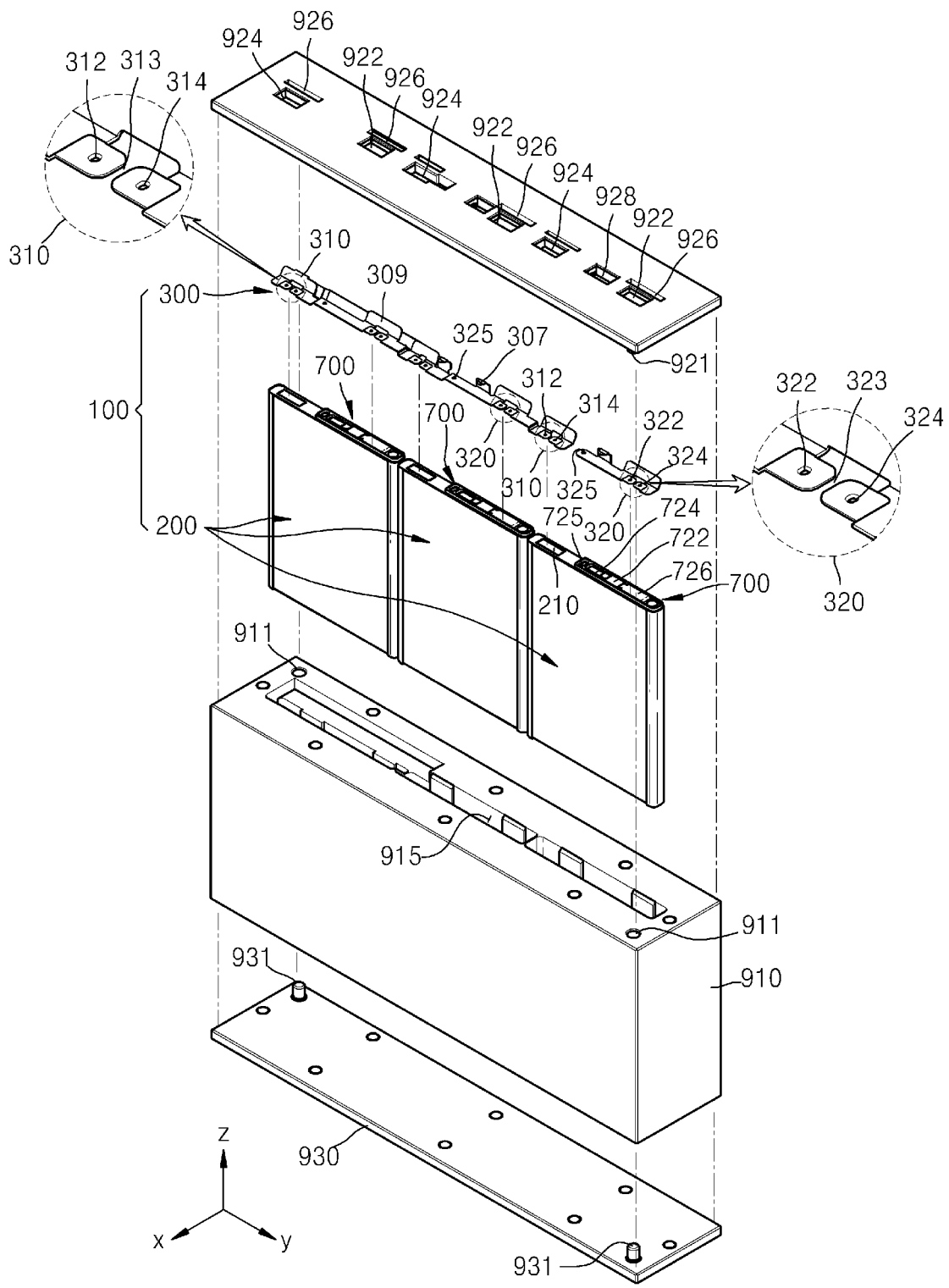
FIG. 2 is an exploded perspective view of the battery cell assembly and the jig assembly shown in FIG. 1.

FIG. 1 is a perspective view schematically showing a battery cell assembly 100 and a jig assembly 900 supporting the battery cell assembly, according to an embodiment of the present invention, and FIG. 2 is an exploded perspective view of the battery cell assembly and the jig assembly shown in FIG. 1. For convenience sake, the following description will assume that ±Z-axis directions are up and down directions, ±X-axis directions are forward and back directions, and ±Y-axis directions are left and right directions in FIG. 1.

Figure 3:
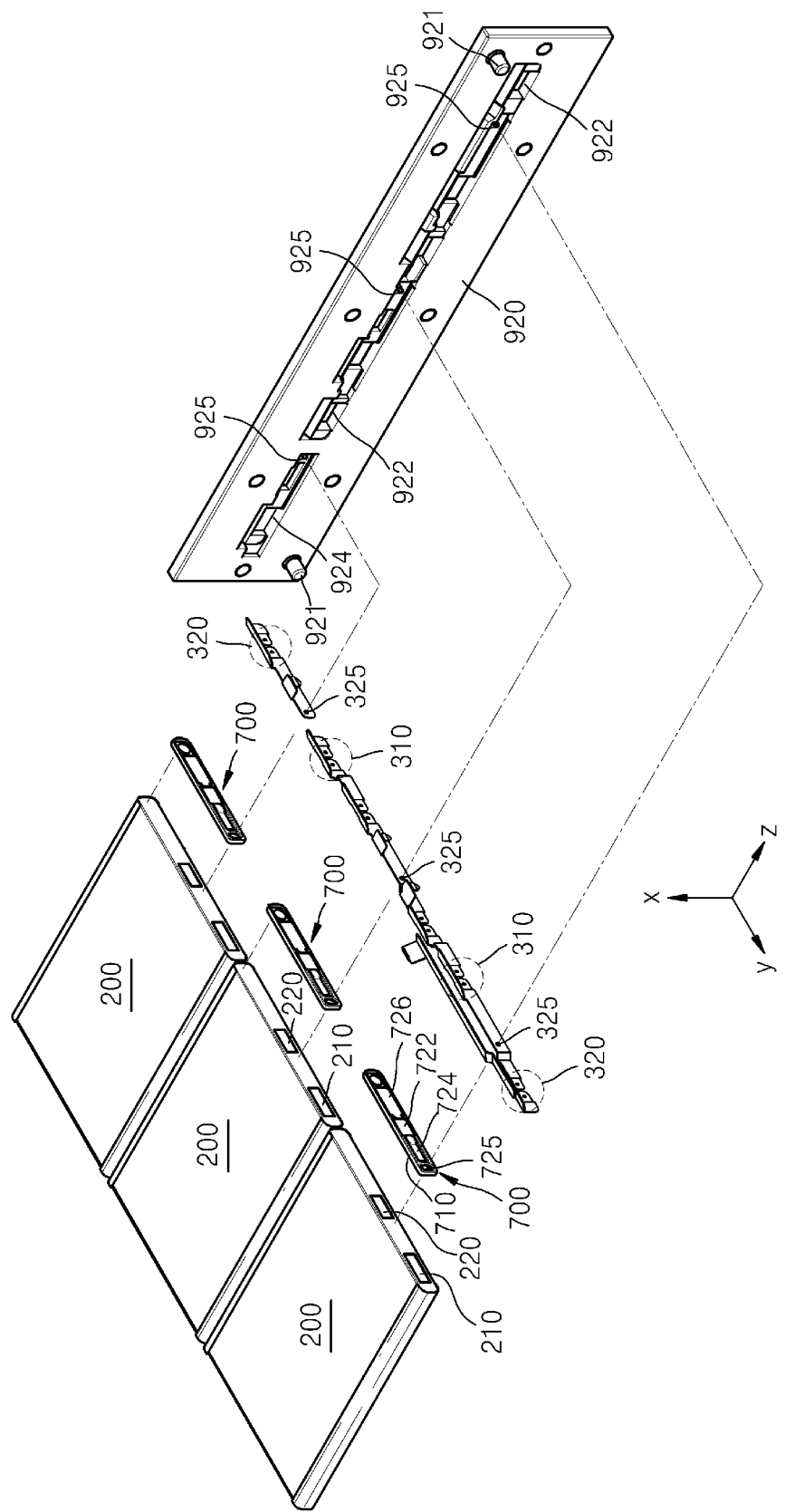
FIG. 3 is a diagram schematically showing a coupling relationship between portions of the battery cell assembly and the jig assembly shown in FIG. 1.
Figure 4:
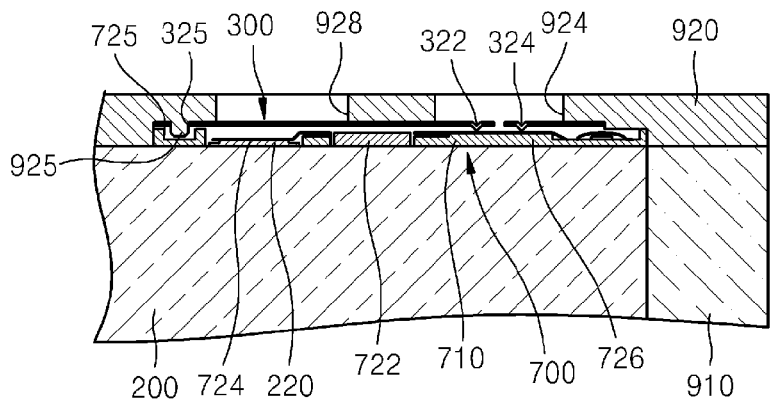
FIG. 4 is a cross-sectional view of some portions of the battery cell assembly shown in FIG. 1.

FIG. 3 is a perspective view schematically showing the cover jig 920 and the battery cells 200 to describe a form in which the cover jig 920, the lead plate 300, and the lead tab 700 are coupled when the cover jig 920 is coupled to the case jig 910. FIG. 4 is a cross-sectional view schematically showing portions of the battery cell 200 and the jig assembly 900 to describe coupling among the cover jig 920, the lead plate 300, and the lead tab 700 when the cover jig 920 is coupled with the case jig 910.

Referring to FIGS. 1 through 4, a battery cell assembly 100 according to the current embodiment may include a plurality of battery cells 200, a plurality of lead tabs 700, and a lead plate 300.

The battery cells 200 are rechargeable secondary cells which may include lithium-ion cells. The battery cell 200 includes an electrode assembly (not shown) and a can for receiving the electrode assembly. The electrode assembly may be manufactured by depositing an anode plate, a cathode plate, and a separator therebetween and then winding them in a jelly roll form. The can may be manufactured with a metallic material. For example, the can may be formed of aluminum or an aluminum alloy, without being limited thereto. The plurality of battery cells 200 may be disposed side-by-side along one direction. The battery cells 200 may be disposed side-by-side such that an anode and a cathode are disposed on a top surface of each battery cell 200. In the current embodiment, three battery cells 200 are serially connected to form one battery cell assembly 100, but the number of battery cells 200 of the battery cell assembly 100 and how to connect the battery cells 200 are not limited to this example and may differ.

The lead tab 700 is disposed on a cathode terminal 220 of the battery cell 200 to be between the cathode terminal 220 of the battery cell 200 and the lead plate 300 and electrically connect the cathode terminal 220 to the lead plate 300. The lead tab 700 may be fixed to the battery cell 200 using a tape (not shown).

The lead tab 700 may include a first lead 724 which is directly connected to the cathode terminal 220 of the battery cell 200, an overheat preventing element 722, a side of which is electrically connected to the first lead 724 to cut off electric current when the battery cell 200 is overheated, and a second lead 726 which is connected to the other side of the overheat preventing element 722 and is connected to the lead plate 300. Generally, much heat is generated near the cathode terminal 220 of the battery cell 200, and by disposing the lead tab 700 having the overheat preventing element 722 on the cathode terminal 220, explosion or deterioration caused by overheat of the battery cell 200 may be effectively prevented or otherwise inhibited.

The lead tab 700 may further include an insulating cover 710 for supporting the first lead 724, the overheat preventing element 722, and the second lead 726, and a groove 725 is formed in an end portion of the insulating cover 710 near the first lead 724. The groove 725 may be formed in a concave form into a top surface of the lead tab 700, or may be formed to perforate the lead tab 700 vertically. While the groove 725 of the lead tab 700 is formed in the insulating cover 710 in the current embodiment, it may also be formed in the first lead 724 or the second lead 726 of the lead tab 700.

In the current embodiment, the lead tab 700 is disposed on the cathode terminal 220, but the lead tab 700 may be disposed on an anode terminal 210 of the battery cell 200 or on both the anode terminal 210 and the cathode terminal 220.

The lead plate 300 connects the plurality of battery cells 200 in series or in parallel, and may include a conductive plate and an insulating film. The conductive plate may be formed of a conductive material, e.g., a nickel-plated copper material. The lead plate 300 may include a first connector 310 which is connected to the anode terminal 210 of the battery cell 200 and a second connector 320 which is connected to the cathode terminal 220 of the battery cell 200. The insulating film is a film made of an electrically insulating material, and is disposed to cover a surface of the conductive plate while exposing the first connector 310 and the second connector 320.

The first connector 310 of the lead plate 300 is connected to the anode terminal 210 of the battery cell 200, and the second connector 320 is connected to the cathode terminal 220 of the battery cell 200. In the current embodiment, the first connector 310 of the lead plate 300 is directly connected to the anode terminal 210 of the battery cell 200, whereas the second connector 320 of the lead plate 300 is connected to the cathode terminal 220 via the lead tab 700.

The first connector 310 of the lead plate 300 may include a first welded portion 312 and a second welded portion 314. The first welded portion 312 and the second welded portion 314 are separately disposed and spaced apart from each other with a slit 313 therebetween. The first welded portion 312 and the second welded portion 314 are welded to the anode terminal 210 of the battery cell 200 through electric resistance welding.

Like the first welded portion 310, the second welded portion 320 of the lead plate 300 may include a first welded portion 322 and a second welded portion 324, which are disposed to be spaced apart from each other with a slit 323 therebetween. The first welded portion 322 and the second welded portion 324 of the second connector 320 are welded to the second lead 726 of the lead tab 700 through electric resistance welding.

In the lead plate 300, a through hole 325 is formed in a portion corresponding to the groove 725 of the lead tab 700. That is, the groove 725 of the lead tab 700 communicates with the outside via the through hole 325 of the lead plate 300. Thus, when the lead plate 300 and the lead tab 700 are accurately aligned with each other, communication between the through hole 325 of the lead plate 300 and the groove 725 of the lead tab 700 may be observed from the outside. Otherwise, if the lead plate 300 and the lead tab 700 are not accurately aligned with each other, a portion other than the groove 725 of the lead tab 700 may be seen via the through hole 325 of the lead plate 300, such that an alignment error between the lead plate 300 and the lead tab 700 may be more easily determined.

Next, a method of manufacturing the battery cell assembly 100, according to the current embodiment of the present invention, will be described. The method of manufacturing the battery cell assembly 100, according to the current embodiment, uses the specially manufactured jig assembly 900, and thus the jig assembly 900 will be described first.

The jig assembly 900 used to manufacture the battery cell assembly 100 according to the current embodiment may include a case jig 910, a bottom plate 930, and a cover jig 920.

The case jig 910 may include a space for receiving the plurality of battery cells 200 therein, and an opening 915 communicating with the space for receiving the plurality of battery cells 200 therein may be formed in a top surface of the case jig 910. When the battery cell 200 is received in the case jig 910, a terminal of the battery cell 200 and the lead tab 700 coupled to the terminal are exposed through the opening 915. An opening (not shown) communicating with the space for receiving the plurality of battery cells 200 therein is also formed in a bottom surface of the case jig 910. That is, the case jig 910 has a through-space which is a vertical perforation, and the battery cells 200 are inserted into the through-space to be stably fixed in position in the case jig 910. In top and bottom surfaces of the case jig 910 coupling holes 911 are formed for respectively coupling with the cover jig 920 and the bottom plate 930.

The bottom plate 930 is coupled to the bottom surface of the case jig 910, and covers a lower side of a battery-receiving space of the case jig 910. Once the bottom plate 930 is coupled to the bottom surface of the case jig 910, the battery cells 200 received in the case jig 910 may stably maintain their positions without downwardly escaping from the case jig 910. The bottom plate 930 may include coupling protrusions 931 that are inserted into the coupling holes 911 in the bottom surface of the case jig 910. When the bottom plate 930 is coupled to the case jig 910, the coupling protrusions 931 of the bottom plate 930 are inserted into the coupling holes 911 of the case jig 910, such that the bottom plate 930 is in an accurate position with respect to the case jig 910 and relative forward/backward and left/right movement of the bottom plate 930 with respect to the case jig 910 may be effectively restricted. In the current embodiment, the coupling protrusions 931 are formed on the bottom plate 930 and the coupling holes 911 are formed in the case jig 910, but reversely, coupling holes may be formed in the bottom plate 930 and coupling protrusions may be formed on the case jig 910. Although the bottom plate 930 is provided separately from the case jig 910 in the current embodiment, the bottom plate 930 may be formed integrally with the case jig 910.

The cover jig 920 is coupled to the top surface of the case jig 910 and includes coupling protrusions 921 that are inserted into the coupling holes 911 formed in the top surface of the case jig 910. Therefore, when the cover jig 920 and the case jig 910 are coupled, the coupling protrusions 921 of the cover jig 920 are inserted into the coupling holes 911 of the case jig 910, such that the cover jig 920 may be seated in an accurate position and may stably maintain its position after being seated. While the coupling protrusions 921 are formed on the cover jig 920 and the coupling holes 911 are formed in the case jig 910 in the current embodiment, positions at which coupling protrusions and coupling holes are formed may be exchanged.

In the cover jig 920, first through holes 922, second through holes 924, third through holes 926 and 928, and guide pins 925 (see FIGS. 3 and 4) are formed.

The first through hole 922 is formed in a position corresponding to the first connector 310 of the lead plate 300 disposed on the anode terminal 210 of the battery cell 200 received in the case jig 910. Thus, when the battery cells 200 are received in the case jig 910 and the lead plate 300 is disposed on the terminal portions of the battery cells 200, if the cover jig 920 is coupled to the top portion of the case jig 910, the first welded portion 312 and the second welded portion 314 of the first connector 310 of the lead plate 300 are exposed via the first through hole 922 of the cover jig 920.

The second through hole 924 is formed in a position corresponding to the second connector 320 of the lead plate 300 disposed on the terminal portion of the battery cell 200 received in the case jig 910. Thus, once the cover jig 920 is coupled to the top portion of the case jig 910, the first welded portion 322 and the second welded portion 324 of the second connector 320 of the lead plate 300 are exposed to the outside via the second through hole 924 of the cover jig 920.

The third through holes 926 and 928 are intended to receive or expose portions 307 and 309 which protrude in a widthwise direction of the lead plate 300. The widthwise protruding portions 307 and 309 of the lead plate 300 may include, for example, the terminal portion 307 for connecting the lead plate 300 with an external circuit and the connecting portion 309 for coupling the first welded portions 312 and 322 with the second welded portions 314 and 324 which are spaced apart with slits 313, 323 therebetween. The protruding portions 307 and 309 may be folded with respect to the lead plate 300. When the cover jig 920 is coupled to the top portion of the case jig 910, the widthwise protruding portions 307 and 309 of the lead plate 300 are inserted into the third through holes 926 and 928 such that the lead plate 300 and the cover jig 920 may be relatively position-aligned with each other.

The guide pin 925 is disposed in a position corresponding to the through hole 325 of the lead plate 300 on the bottom surface of the cover jig 920, and protrudes downwardly.

Referring to FIGS. 3 and 4, when the cover jig 920 is coupled to the case jig 910 (not shown in FIG. 3), the guide pin 925 of the cover jig 920 passes through the through hole 325 of the lead plate 300 and is inserted into the groove 725 of the lead tab 700. Once the guide pin 925 of the cover jig 920 is inserted into the through hole 325 of the lead plate 300, the cover jig 920 and the lead plate 300 are positioned relative to each other. That is, the lead plate 300 is position-aligned with the cover jig 920.

Since the guide pin 925 of the cover jig 920 passes through the through hole 325 of the lead plate 300 and is inserted into the groove 725 of the lead tab 700, relative position alignment between the cover jig 920 and the lead tab 700 may be instantly checked. If the guide pin 925 of the cover jig 920 is not inserted into the groove 725 of the lead tab 700 when the cover jig 920 is coupled to the case jig 910, then an alignment error between the cover jig 920 and the lead tab 700 may be instantly determined.

If the guide pin 925 of the cover jig 920 passes through the through hole 325 of the lead plate 300 and is inserted into the groove 725 of the lead tab 700 when the cover jig 920 is coupled to the case jig 910, then the cover jig 920, the lead plate 300, and the lead tab 700 are accurately aligned as shown in FIG. 4. Thus, the second connector 320 of the lead plate 300 accurately contacts a top portion of the second lead 726 of the lead tab 700 and at the same time, is exposed via the second through hole 924 of the cover jig 920. In this state, the first through hole 922 of the cover jig 920, the first connector 310 of the lead plate 300, and the anode terminal 210 of the battery cell 200 are accurately aligned vertically, and the first connector 310 of the lead plate 300 is exposed to the outside via the first through hole 922 of the cover jig 920.

Next, a method of manufacturing the battery cell assembly 100, according to an embodiment of the present invention, by using the jig assembly 900 will be described in detail.

Figure 5:
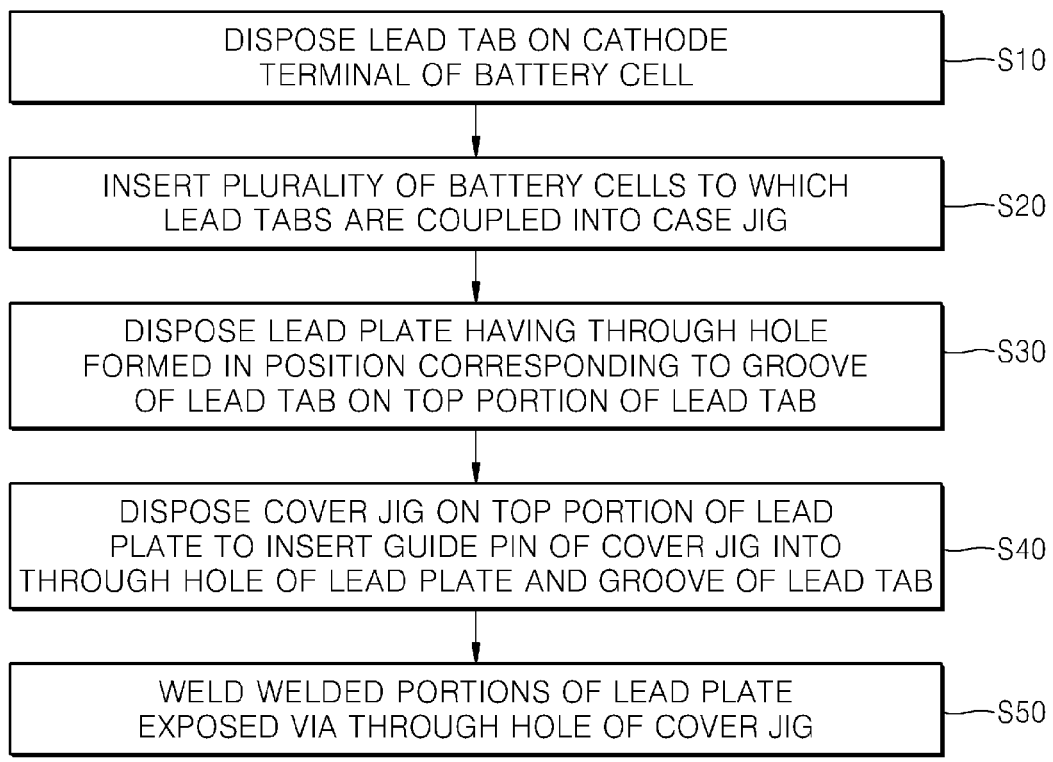
FIG. 5 is a flowchart of a method of manufacturing the battery cell assembly, according to an embodiment of the present invention.

FIG. 5 is a flowchart of a method of manufacturing the battery cell assembly 100, according to an embodiment of the present invention.

Referring to FIG. 5, the method of manufacturing the battery cell assembly 100, according to the current embodiment, may include operation S10 of disposing the lead tab 700 on the terminal portion of the battery cell 200, operation S20 of inserting the battery cell 200 into the case jig 910, operation S30 of disposing the lead plate 300 on the top portion of the lead tab 700, operation S40 of disposing the cover jig 920 on the top portion of the lead plate 300, and operation S50 of welding first and second connectors 310 and 320 of the lead plate 300.

In operation S10 in which the lead tab 700 is disposed on the terminal portion of the battery cell 200, the lead tab 700 having the groove 725 formed therein is disposed on the terminal portion of the battery cell 200, e.g., the cathode terminal 220. To fix the lead tab 700 to the terminal portion of the battery cell 200, a tap may be used.

In operation S20 in which the battery cells 200 are inserted into the case jig 910, the battery cells 200 are inserted into the case jig 910 to position-fix the battery cells 200 in the case jig 910. Once the battery cell 200 is inserted into the case jig 910, the lead tab 700, which is connected to the terminal portions of the battery cells 200, that is, the anode terminal 210 and the cathode terminal 220, is exposed. The bottom plate 930 may be coupled to the bottom portion of the case jig 910.

In operation S30 in which the lead plate 300 is disposed on the top portion of the lead tab 700, the lead plate 300 is disposed on top portions of the terminal portions of the battery cells 200 received in the case jig 910. The first connector 310 of the lead plate 300 is positioned on the anode terminal 210 of the battery cell 200, and the second connector 320 of the lead plate 300 is positioned on the second lead 726 of the lead tab 700. The through hole 325 of the lead plate 300 is positioned corresponding to the groove 725 of the lead tab 700, such that the through hole 325 of the lead plate 300 and the groove 725 of the lead tab 700 communicate with each other.

In operation S40 in which the cover jig 920 is disposed on the top portion of the lead plate 300, the cover jig 920 is disposed on the top portion of the case jig 910 to cover the lead plate 300 with the cover jig 920. In this case, the guide pin 925 of the cover jig 920 passes through the through hole 325 of the lead plate 300 and is inserted into the groove 725 of the lead tab 700. That is, when the cover jig 920 is coupled to the case jig 910, the guide pin 925 of the cover jig 920 holds the position of the lead plate 300. Thus, the lead plate 300 is aligned at an accurate position with respect to the lead tab 700 and the cover jig 920. In the cover jig 920, the first through hole 922 and the second through hole 924 corresponding to the first connector 310 and the second connector 320 of the lead plate 300 are formed such that the first connector 310 and the second connector 320 of the lead plate 300 are exposed to the outside.

In operation S50 where first and second connectors 310 and 320 of the lead plate 300 are welded, the first connector 310 and the second connector 320 of the lead plate 300 exposed through the first through hole 922 and the second through hole 924 are welded using an electric resistance welding device. This operation may be performed by inserting an anode SD1 and a cathode SD2 of the electric resistance welding device into the first through hole 922 and the second through hole 924 of the cover jig 920, as shown in FIG. 1, to connect the anode SD1 and the cathode SD2 to the first welded portions 312 and 322 and the second welded portions 314 and 324 of the first connector 310 and the second connector 320, and applying a high voltage to the anode SD1 and the cathode SD2. The electric resistance welding is a widely known technique which involves welding using high-temperature heat generated by electric resistance of an interface between welding targets when high current is applied to the welding targets which contact each other. Once electric resistance welding is performed as such, the first welded portion 312 and the second welded portion 314 of the first connector 310 of the lead plate 300 are welded to the anode terminal 210 of the battery cell 200 and the first welded portion 322 and the second welded portion 324 of the second connector 320 of the lead plate 300 are welded to the lead tab 700 which is connected to the cathode terminal 220 of the battery cell 200.

Upon completion of welding, the cover jig 920 is separated from the case jig 910 and the battery cell 200 and the lead plate 300 coupled thereto by welding are removed from the case jig 910, such that the battery cell assembly 100 according to the current embodiment is manufactured. The battery cell assembly 100 manufactured in this way may be completed as a battery pack after a protection circuit module is connected to the lead plate 300 and casing processing is performed.

In the method of manufacturing the battery cell assembly 100, according to the current embodiment, welding is performed when the lead plate 300 is accurately aligned with the battery cell 200 and the lead tab 700, such that a connection failure of the lead plate 300 caused by misalignment of the lead plate 300 may be effectively prevented. That is, in the method of manufacturing the battery cell assembly 100 according to the current embodiment, the quality and yield of the battery cell assembly 100 may be effective increased. Moreover, by employing the battery cell assembly 100 in the battery pack, the quality and yield of the battery pack may also be improved.

With the battery cell assembly, the battery pack, the method of manufacturing the battery cell assembly, and a jig assembly according to the present invention, battery cells and a lead plate may be accurately aligned, such that welded portions between the battery cells and the lead plate may be formed at accurate positions.

While the present invention has been described with reference to the aforementioned embodiments, various modifications or changes can be made without departing from the subject matter or scope of the present invention. Therefore, the scope of the appended claims may include such modifications or changes included in the subject matter of the present invention.

What is claimed is:

1. A system comprising:
   a battery cell assembly, wherein the battery cell assembly comprises:
      a plurality of battery cells comprising anode terminals and cathode terminals;
      a plurality of lead tabs disposed on at least one of the anode terminal and the cathode terminal of each battery cell, wherein a groove is formed in each lead tab; and
      a lead plate disposed on and electrically connected to top portions of the plurality of lead tabs, the lead plate comprising a connector contacting the plurality of lead tabs and one or more through holes formed in a position corresponding to at least one of the grooves of the lead tab; and a jig assembly for welding a lead tab and a lead plate of a battery cell assembly, wherein the jig assembly comprises:

a case jig receiving the battery cell assembly therein, the case jig comprising an opening formed therein to expose the lead plate to the outside; and a cover jig coupled to the opening of the case jig to be disposed on a top portion of the lead plate, the cover jig comprising an exposure opening for exposing the connector of the lead plate and a guide pin passing through the through hole of the lead plate to be inserted into the lead tab.

2. The system of claim 1, wherein one of the case jig and the cover jig comprises a coupling groove, and the other of the case jig and the cover jig comprises a coupling protrusion that is inserted into the coupling groove when the case jig and the cover jig are coupled.

3. The system of claim 2, wherein the jig assembly further comprises a bottom plate that engages with a second opening of the case jig.

4. The system of claim 1, wherein the cover jig further comprises a plurality of through holes and a plurality of guide pins, wherein the plurality of through holes are formed in a position corresponding to the connectors of the lead plate.

5. The system of claim 4, wherein the cover jig includes a plurality of through holes that are formed to receive portions of the lead plate that protrude in a widthwise direction from the lead plate.

6. The system of claim 5, wherein the guide pin is positioned to engage with a through hole in the lead plate to align the cover jig lead plate.

7. A method of manufacturing a battery cell assembly, the method comprising:

providing a plurality of battery cells comprising anode terminals and cathode terminals;

disposing a lead tab having a groove formed therein on at least one of the anode terminal and the cathode terminal of the battery cell;

disposing a lead plate on a top portion of the lead tab, the lead plate having a through hole formed in a position corresponding to the groove of the lead tab and comprising a connector welded to the lead tab;

disposing a cover jig on a top portion of the lead plate, the cover jig having formed therein an exposure opening for exposing the connector and comprising a guide pin passing through the through hole of the lead plate to be inserted into the groove of the lead tab; and electric-resistance-welding the connector of the lead plate through the exposure opening of the cover jig, whereby the battery cell assembly of claim 1 is obtained.

8. The method of claim 7, further comprising inserting the battery cells into the case jig comprising an opening, through which the lead plate is exposed, wherein in the disposing of the cover jig, the cover jig is coupled to the opening of the case jig.

9. The method of claim 7, wherein one of the case jig and the cover jig comprises a coupling groove, and the other of the case jig and the cover jig comprises a coupling protrusion that is inserted into the coupling groove when the case jig and the cover jig are coupled.

* * * * *